United States Patent [19]

Borman et al.

[11] Patent Number: 5,306,785
[45] Date of Patent: Apr. 26, 1994

[54] POLY(ALKYLENE CYCLOHEXANE-DICARBOXYLATE) BINARY BLENDS

[75] Inventors: Willem F. H. Borman, Evansville; Nan-I Liu, Mt. Vernon, both of Ind.

[73] Assignee: General Electric Company, Pittsfield, Mass.

[21] Appl. No.: 956,818

[22] Filed: Oct. 5, 1992

Related U.S. Application Data

[63] Continuation of Ser. No. 551,395, Jul. 12, 1990, abandoned.

[51] Int. Cl.$^5$ .............................................. C08L 67/02
[52] U.S. Cl. ................................... 525/425; 525/64; 525/66; 525/175; 525/176; 525/177; 525/444
[58] Field of Search ....................................... 525/425

[56] References Cited

U.S. PATENT DOCUMENTS

| | | |
|---|---|---|
| 2,347,562 | 4/1944 | Johnston . |
| 2,465,319 | 3/1949 | Whinfield et al. . |
| 2,675,390 | 4/1954 | Rosenblatt . |
| 2,888,484 | 5/1959 | Dehm et al. . |
| 2,891,930 | 6/1959 | Caldwell et al. . |
| 2,901,466 | 8/1959 | Kibler et al. . |
| 3,047,539 | 7/1962 | Pengilly . |
| 3,444,327 | 5/1969 | Jaffe . |
| 3,515,628 | 6/1970 | Jackson, Jr. et al. . |
| 4,066,600 | 1/1978 | Pletcher et al. . |
| 4,125,572 | 11/1978 | Scott . |
| 4,327,206 | 4/1982 | Jackson, Jr. et al. . |
| 4,659,765 | 4/1987 | Liu ...................................... 524/447 |
| 4,754,064 | 6/1988 | Lillwitz . |
| 4,814,380 | 3/1989 | Liu . |
| 5,026,760 | 6/1991 | Liu ...................................... 524/449 |

OTHER PUBLICATIONS

W. J. Jackson, Jr. et al., "Polyester Hot-Melt Adhesives. I. Factors Affecting Adhesion to Epoxy Resin Coatings", Journal of Applied Polymer Science, vol. 14, pp. 685–698 (1970).
Freifelder et al., Journal of Organic Chemistry, 31, 34–38 (1966).
Wilfong et al., J. Polymer Sci., vol. 54, 385–410 (1961).
Carpenter et al., Journal of Soc. Dyers and Colorists, vol. 65, 469 (1941).

*Primary Examiner*—Patricia A. Short

[57] ABSTRACT

Compositions are provided which comprise a polyester resin which comprises the reaction product of at least one straight chain, branched, or cycloaliphatic $C_2-C_{10}$ alkane diol or chemical equivalent thereof; and a cycloaliphatic diacid or chemical equivalent thereof; and a poly(ether ester) elastomer, a poly(etherimide ester) elastomer, a copolymer elastomer comprising (ether ester) monomers and (etherimide ester) monomers, a copolymer comprising ethylene and one or more comonomers copolymerizable therewith to provide a solid copolymer, or a combination of any of the foregoing. These compositions have excellent tensile properties.

30 Claims, No Drawings

POLY(ALKYLENE CYCLOHEXANE-DICARBOXYLATE) BINARY BLENDS

This is a continuation of copending application Ser. No. 07/551,395 filed on Jul. 12, 1990, now abandoned.

CROSS-REFERENCE TO RELATED APPLICATIONS

This application is related to the following commonly owned, concurrently filed U.S. Patent applications.

| SERIAL NO. | SUBJECT MATTER | APPLICANT(S) |
| --- | --- | --- |
| 07/551,392 | Poly(alkylene cyclo-hexanedicarboxylate)-polycarbonate Compositions and Modifications | W. F. H. Borman N-I Liu |
| 07/551,397 | Modifications of Poly(alkylene cyclohexanedi-carboxylate) Blends | W. F. H. Borman N-I Liu |
| 07/551,396 | Poly(alkylene cyclo-hexanedicarboxylate)-(alkylene terephthalate) Copolyesters | W. F. H. Borman |

FIELD OF THE INVENTION

This invention relates to compositions comprising (A) polyester resins comprising the reaction product of at least one straight chain, branched, or cycloaliphatic $C_2-C_{10}$ alkane diol or a chemical equivalent thereof, and at least one cycloaliphatic diacid or chemical equivalent thereof and (B) a poly(ether ester) elastomer, a poly(etherimide ester) elastomer, a copolymer elastomer comprising (ether ester) monomers and (etherimide ester) monomers, a copolymer comprising ethylene and one or more comonomers copolymerizable therewith to produce a solid copolymer, or a combination of any of the foregoing. Filled and flame retardant compositions as above are contemplated as well.

These compositions have increased tensile strength when compared with the tensile strength of the polyester component or the modifier component alone. Surprisingly, the compositions exhibit enhanced melt flow in comparison with state of the art materials as well.

BACKGROUND OF THE INVENTION

Novel compositions comprising a polyester resin which is the reaction product of at least one straight chain, branched, or cycloaliphatic $C_2-C_{10}$ alkane diol or a chemical equivalent thereof and at least one cycloaliphatic diacid or a chemical equivalent thereof combined with a poly(ether ester) elastomer, a poly(etherimide ester) elastomer, a copolymer elastomer comprising (ether ester) monomers and (etherimide ester) monomers, a copolymer comprising (i) ethylene and (ii) one or more comonomers copolymerizable therewith to produce a solid copolymer have been discovered which have improved tensile strength.

Weatherable, UV radiation resistant, solvent resistant, resilient, high tensile strength, high impact polymers have great application in the manufacture of molded or thermoformed products such as automobile external parts, lawn and garden equipment, and sporting goods.

Crystallizable polyesters of cycloaliphatic diacids or derivatives thereof with aliphatic and/or cycloaliphatic diols have relatively high melting points and are quite UV resistant as they do not appreciably absorb near-UV light. Many of these polyesters were explored for use as hot melt adhesives. See, Jackson et al., J. Applied Polymer Science, Vol. 14, 685–98, (1970); U.S. Pat. No. 3,515,628.

Wilfong, J. Polymer Sci., Vol. 54, 385–410, (1961), referred to polyesters of hexahydro terephthalic acid, the cis-/trans-mixture of cyclohexanedicarboxylic acids obtained by the hydrogenation of terephthalic acid. See, Caldwell et al, U.S. Pat. No. 2,891,930 including poly(-neopentyl cyclohexanedicarboxylate); Carpenter, Journal of Soc. Dyers and Colorists, Vol. 65, 469 (1941).

Kibler et al, U.S. Pat. No. 2,901,466, disclose linear polyesters and polyester-amides prepared by condensing cis- and/or trans-1,4-cyclohexanedimethanol with one or more bifunctional reactants, which because of high melting temperatures, are advantageous for the preparation of fibers for use in fabrics and films for use as support for photographic emulsions.

Friction activatable solvent-free adhesives comprising a thermoplastic polyester derived from one or more saturated aliphatic dicarboxylic acid and/or aromatic dicarboxylic acids and one or more saturated aliphatic diols, a tackifier, and a plasticizer are disclosed by Wayne et al, U.S. Pat. No. 4,066,600.

Jackson et al, U.S. Pat. No. 4,327,206, disclose a process for the preparation of poly(1,4-cyclohexanedicarboxylate) polyesters with high trans-isomer content comprising heating, in the presence of a suitable catalyst, an ester of trans-1,4-cyclohexanedicarboxylic acid and a diacyl derivative of an aromatic diol.

Liu, U.S. Pat. No. 4,814,380, discloses thermoplastic elastomeric molding compositions comprising a poly(etherimide ester) elastomer modified with a combination of poly(butylene terephthalate), a monoalkenyl arene-conjugated diene copolymer and a polycarbonate.

A major deficiency of the previous compositions has been their relatively low tensile strength. This disadvantage is overcome by the compositions of the present invention. The tensile strength at yield of the polyester resins of the present invention are improved by the addition of poly(ether ester) elastomers, poly(ethermide ester) elastomers, (ether ester)/(etherimide ester) copolymer elastomers, EVA type copolymers or combinations of any of the foregoing modifier polymers each of which has a lower tensile strength than the polyester resin.

SUMMARY OF THE INVENTION

According to the present invention, there are provided compositions comprising (A) a polyester resin comprising the reaction product of (a) at least one straight chain, branched, or cycloaliphatic $C_2-C_{10}$ alkane diol or chemical equivalent thereof; and (b) at least one cycloaliphatic diacid or chemical equivalent thereof; and (B)(a) a poly(ether ester) elastomer, (b) a poly (etherimide ester) elastomer, (c) a copolymer elastomer comprising (i) (ether ester) monomers and (ii) (etherimide ester) monomers, (d) a copolymer comprising (i) ethylene and (ii) one or more comonomers copolymerizable therewith to produce a solid copolymer, or (e) a combination of any of the foregoing.

DETAILED DESCRIPTION OF THE INVENTION

The diols useful in the preparation of polyester resins (A) of the present invention are straight chain, branched, or cycloaliphatic but preferably straight chain or branched alkane diols and may contain from 2 to 10 carbon atoms. Examples of such glycols include, but are not limited to, ethylene glycol; propylene glycol, i.e. 1,2- and 1,3-propylene glycols; butane diol, i.e., 1,3- and 1,4-butane diol; diethylene glycol; 2,2-dimethyl-1,3-propane diol; 2-ethyl, 2-methyl, 1,3-propane diol; 1,3- and 1,5-pentane diol; dipropylene glycol; 2-methyl, 1,5-pentane diol; 1,6-hexane diol; 1,4-cyclohexane dimethanol and particularly its cis- and trans-enantiomers; triethylene glycol; 1,10-decane diol; and mixtures of any of the foregoing. Particularly preferred is 1,4-butane diol. If a cycloaliphatic diol or chemical equivalent thereof and particularly 1,4-cyclohexane dimethanol or its chemical equivalents are to be used as the diol component, it is preferred that a mixture of cis- to trans-enantiomer thereof, ranging from 1 to 4 to 4 to 1 and preferably a ratio of 1 to 3 is used.

Chemical equivalents of these diols include esters and ethers such as dialkyl esters, diaryl esters, polytetramethylene oxide, and the like.

The diacids (A)(b) useful in the preparation of the polyester resins (A) of the present invention are cycloaliphatic diacids. This is meant to include carboxylic acids having two carboxyl groups each of which is attached to a saturated carbon in a saturated ring. A preferred diacid is 1,4-cyclohexanedicarboxylic acid and most preferred is trans-1,4-cyclohexane dicarboxylic acid as further explained below.

Cyclohexanedicarboxylic acids and their chemical equivalents can be prepared, for example, by the hydrogenation of cycloaromatic diacids and corresponding derivatives such as isophthalic acid or terephthalic acid in a suitable solvent, water or acetic acid at room temperature and at atmospheric pressure using suitable catalysts such as rhodium supported on a suitable carrier of carbon or alumina. See, Freifelder et al, *Journal of Organic Chemistry*, 31, 3438 (1966); U.S. Pat. Nos. 2,675,390 and 4,754,064. They may also be prepared by the use of an inert liquid medium in which a phthalic acid is at least partially soluble under reaction conditions and a catalyst of palladium or ruthenium in carbon or silica. See, U.S. Pat. Nos. 2,888,484 and 3,444,237.

Typically, in the hydrogenation, two enantiomers are obtained in which the carboxylic acid groups are in cis- or trans-positions. The cis- and trans-enantiomers can be separated by crystallization with or without a solvent, for example, n-heptane, or by distillation. The cis-enantiomer tends to blend better; however, the trans-enantiomer has higher melting and crystallization temperatures and is especially preferred. Mixtures of the cis- and trans-enantiomers are useful herein as well, and preferably when such a mixture is used, the trans-enantiomer will comprise at least 75 parts by weight and the cis-enantiomer will comprise the remainder based upon 100 parts by weight of cis- and trans-enantiomer combined.

When a mixture of enantiomers or more than one different diacid is used, a copolyester or a mixture of two polyesters for use as component (A) may be used.

Chemical equivalents of the cycloaliphatic diacids include esters, alkyl ester, e.g., dialkyl esters, diaryl esters, anhydrides, acid chlorides, acid bromides, and the like. The preferred chemical equivalents comprise the dialkyl esters of the cycloaliphatic diacids, and the most preferred chemical equivalent comprises the dimethyl ester of the cycloaliphatic diacid, particularly dimethyl-trans-1,4-cyclohexanedicarboxylate.

Dimethyl-1,4-cyclohexanedicarboxylate can be obtained by ring hydrogenation of dimethylterephthalate, and two enantiomers having the carboxylic acid groups in the cis- or trans- positions are obtained. The enantiomers can be separated as above, and the trans-enantiomer is especially preferred for the reasons above. Mixtures of the enantiomers are suitable as explained above and preferably in amounts as explained above.

The polyester resins (A) of the present invention are typically obtained through the condensation or ester interchange polymerization of the diol or diol equivalent component (A)(a) with the diacid or diacid equivalent component (A)(b) and have recurring units of the formula

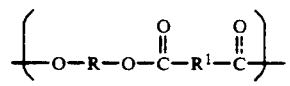

wherein
R represents an alkyl or cycloalkyl radical containing 2 to 10 carbon atoms and which is the residue of a straight chain, branched, or cycloaliphatic alkane diol having 2 to 10 carbon atoms or of a chemical equivalent thereof; and
$R^1$ is a cycloaliphatic radical which is the decarboxylated residue derived from a cycloaliphatic diacid or chemical equivalent thereof. They particularly have recurring units of the formula

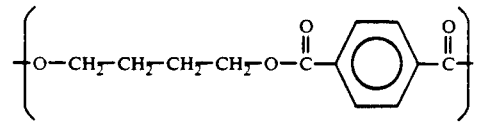

wherein
R from above is derived from 1,4-butane diol; and wherein $R^1$ from above is a cyclohexane ring derived from cyclohexanedicarboxylate or a chemical equivalent thereof and is selected from the cis- or trans-enantiomers thereof.

All such polyesters can be made following the teachings of, for example, U.S. Pat. Nos. 2,465,319 and 3,047,539.

The reaction is generally run with an excess of the diol component and in the presence of a suitable catalyst such as a tetrakis(2-ethyl hexyl)titanate, in a suitable amount, typically about 20 to 200 ppm of titanium based upon the final product.

The poly(ether ester) elastomer modifier (B)(a) for use in the invention is a random or a block copolymer consisting of polyester segments and polyether segments having molecular weights of 400 to 20,000. In general, these are prepared by conventional esterification/polycondensation processes from (i) one or more diols, (ii) one or more dicarboxylic acids, (iii) one or more long chain ether glycols, and optionally, (iv) one or more lactones or polylactones.

Diols (B)(a)(i) which can be used in the preparation of these poly(ether ester) elastomers include both saturated and unsaturated aliphatic and cycloaliphatic dihydroxy compounds. These diols are preferably of low molecular weight, i.e. having molecular weight of about 250 or less.

The term "diols" and "low molecular weight diols" with respect to the poly(ether ester) elastomers include equivalent ester forming derivatives thereof, provided, however, that the molecular weight requirement pertains to the diol only and not to its derivatives. Ester forming derivatives include the acetates of the diols as well as, for example, ethylene oxide or ethylene carbonate for ethylene glycol.

Preferred saturated and unsaturated aliphatic and cycloaliphatic diols useful in the production of the poly(ether ester) elastomers are generally those having from about 2 to about 20 carbon atoms, including ethylene glycol; propanediol; butanediol; pentanediol; 2-methyl propanediol; 2,2-dimethyl propanediol; hexanediol; decanediol; 1,2-, 1,3- and 1,4-dihydroxy cyclohexane; 1,2-, 1,3-, and 1,4-cyclohexane dimethanol; butenediol; hexenediol, and the like. Especially preferred are 1,4-butane diol and mixtures thereof with hexanediol or butenediol.

Aromatic diols suitable for use in the preparation of the poly(ether ester) elastomers are generally those having from 6 to about 19 carbon atoms. Included among the aromatic dihydroxy compounds are resorcinol; hydroquinone; 1,5-dihydroxy naphthalene; 4,4'-dihydroxy diphenyl; bis(p-hydroxy phenyl)methane and 2,2-bis(p-hydroxy phenyl) propane.

Especially preferred diols are the saturated aliphatic diols, mixtures thereof and mixtures of a saturated diol(s) with an unsaturated diol(s), wherein each diol contains from 2 to about 8 carbon atoms. Where more than one diol is employed, it is preferred that at least about 60 mole percent and most preferably at least 80 mole percent, based on the total diol content, is the same diol. As mentioned above, the preferred poly(ether ester) elastomers are those in which 1,4-butane diol is present in a predominant amount.

Dicarboxylic acids (B)(a)(ii) which are suitable for use in the preparation of the poly(ether ester) elastomers include aliphatic, cycloaliphatic, and/or aromatic dicarboxylic acids. These acids are preferably of a low molecular weight, i.e. having a molecular weight of less than about 350; however, higher molecular weight dicarboxylic acids, especially dimer acids, may also be used. The term "dicarboxylic acids" with respect to the poly(ether ester) elastomers includes equivalents of dicarboxylic acids having two functional carboxyl groups which perform substantially like dicarboxylic acids in reaction with glycols and diols in forming polyester polymers. These equivalents include esters and ester-forming derivatives, such as acid halides and anhydrides. Additionally, the dicarboxylic acids may contain any substituent group(s) or combinations which do not substantially interfere with the polymer formation and use of the polymer in the practice of this invention.

Aliphatic dicarboxylic acids, with respect to the poly(ether ester) elastomers, include carboxylic acids having two carboxyl groups each of which is attached to a saturated carbon atom. If the carbon atom to which the carboxyl group is attached is saturated and is in a saturated ring, the acid is cycloaliphatic.

Aromatic dicarboxylic acids useful in the preparation of poly(ether ester) elastomers are dicarboxylic acids having two carboxyl groups each of which is attached to a carbon atom in an isolated or fused benzene ring system. It is not necessary that both functional carboxyl groups be attached to the same aromatic ring, and where more than one ring is present, they can be joined by aliphatic or aromatic divalent radicals or divalent radicals such as —O— or —$SO_2$—.

Representative aliphatic and cycloaliphatic acids which can be used in the preparation of the poly(ether ester) elastomers are preferably $C_4$–$C_{44}$ dicarboxylic acids such as but not limited to sebacic acid, 1,2-cyclohexane dicarboxylic acid, 1,3-cyclohexane dicarboxylic acid, 1,4-cyclohexane dicarboxylic acid, adipic acid, glutaric acid, succinic acid, oxalic acid, azelaic acid, diethylmalonic acid, allylmalonic acid, dimer acid, 2-ethylsuberic acid, tetramethylsuccinic acid, cyclopentane dicarboxylic acid, decahydro-1,5-naphthalene dicarboxylic acid, 4,4'-bicyclohexyl dicarboxylic acid, decahydro-2,6-naphthalene dicarboxylic acid, 4,4-methylenebis-(cyclohexane carboxylic acid), 3,4-furandicarboxylic acid, and 1,1-cyclobutanedicarboxylic acid. Preferred aliphatic acids are cyclohexanedicarboxylic acid, sebacic acid, dimer acid, glutaric acid, azelaic acid and adipic acid.

Representative aromatic dicarboxylic acids which can be used in this preparation include terephthalic, phthalic and isophthalic acids, bi-benzoic acid, substituted dicarboxy compounds with two benzene nuclei such as bis(p-carboxyphenyl) methane, oxybis(benzoic acid), ethylene, 1,2-bis-(p-oxybenzoic acid), 1,5-naphthalenedicarboxylic acid, 2,6-naphthalenedicarboxylic acid, 2,7-naphthalenedicarboxylic acid, phenanthrenedicarboxylic acid, anthracenedicarboxylic acid, 4,4'-sulfonyldibenzoic acid, and halo and $C_1$–$C_{12}$ alkyl, alkoxy, and aryl ring substitution derivatives thereof. Hydroxy acids such as p-(beta-hydroxyethoxy)benzoic acid can also be used provided an aromatic dicarboxylic acid is also present.

Preferred dicarboxylic acids for the preparation of the poly(ether ester) elastomers are the aromatic dicarboxylic acids, mixtures thereof and mixtures of one or more dicarboxylic acids with an aliphatic and/or cycloaliphatic dicarboxylic acid, most preferably the aromatic dicarboxylic acids. Among the aromatic acids, those with 8–16 carbon atoms are preferred, particularly the benzene dicarboxylic acids, i.e., phthalic, terephthalic and isophthalic acids and their dimethyl derivatives. Especially preferred is dimethyl terephthalate.

Where mixtures of dicarboxylic acids are employed, it is preferred that at least about 60 mole percent, and preferably at least about 80 mole percent, based on 100 mole percent of dicarboxylic acid (B)(a)(ii) are of the same dicarboxylic acid or ester derivative thereof. As mentioned above, the preferred poly(ether esters) are those in which dimethyl terephthalate is the predominant dicarboxylic acid.

Suitable long chain ether glycols (B)(a)(iii) which can be used in the preparation of the thermoplastic poly(ether ester) elastomers are preferably poly(oxyalkylene)-glycols and copoly(oxyalkylene)glycols of molecular weight of from about 400 to 12000. Preferred poly(oxyalkylene) units are derived from long chain ether glycols of from about 900 to about 4000 molecular weight and have a carbon-to-oxygen ratio of from about 1.8 to about 4.3, exclusive of any side chains.

Representative of suitable poly(oxyalkylene) glycols are poly(ethylene ether)glycol; poly(propylene ether)-glycol; poly(tetramethylene ether) glycol; random or block copolymers of ethylene oxide and propylene oxide, including ethylene oxide end-capped poly(propylene ether)glycol or propylene oxide end-capped poly(ethylene ether)glycol and predominately poly(ethylene ether), poly(propylene ether), or poly(ethylene ether) and poly(propylene ether) backbone, copoly(propylene ether-ethylene ether) glycol; and random or block copolymers of tetrahydrofuran with minor amounts of a second monomer such as ethylene oxide, propylene oxide, or methyltetrahydrofuran used in proportions such that the carbon-to-oxygen ratio does not exceed about 4.3. Polyformal glycols prepared by reacting formaldehyde with diols such as 1,4-butanediol and 1,5-pentanediol are also useful. Especially preferred poly(oxyalkylene) glycols are poly(propylene ether) glycol, poly(tetramethylene ether) glycol and predominantly poly(ethylene ether), poly(propylene ether), or poly(ethylene ether) and poly(propylene ether) backbone copoly(propylene ether-ethylene ether)glycol.

Optionally, these poly(ether ester) elastomers may have incorporated therein one or more lactones or polylactones (iv). Such lactone modified poly(ether ester) are disclosed in pending U.S. patent application Ser. No. 643,985 filed Aug. 24, 1984.

Lactones (B)(a)(iv) suitable herein are widely available commercially, e.g., Union Carbide Corporation and Aldrich Chemicals. While epsilon caprolactone is especially preferred, it is also possible to use substituted lactones wherein the lactone is substituted by a lower alkyl group such as a methyl or ethyl group at the alpha, beta, gamma, delta, or epsilon positions. Additionally, it is possible to use polylactone, including homopolymers and copolymers thereof with one or more components, as well as hydroxy terminated polylactone, as block units in these poly(ether esters). Suitable polylactones and processes for their production are described in for example, U.S. Pat. Nos. 3,761,511; 3,767,627; and 3,806,495.

These poly(ether ester) elastomer modifiers are more fully described in copending application, U.S. Ser. No. 07/279,353, filed Dec. 7, 1988.

In general, suitable poly(ether ester) elastomers (B)(a) are those in which the weight percent of (iii) long chain ether glycol component or the combined weight percent of (iii) long chain ether glycol component and (iv) lactone component in the poly(ether ester) is from about 5 to about 80 weight percent. Preferably, the weight percent of (iii) or (iii) and (iv) is from about 10 to 50 weight percent.

As described above, the poly(ether ester) elastomers (B)(a) may be prepared by conventional esterification/condensation reactions for the production of polyesters. Exemplary of the processes that may be practiced are as set forth in for example, U.S. Pat. Nos. 3,023,192; 3,763,109; 3,651,014; 3,663,653; and 3,801,547. Additionally, these modifiers may be prepared by known processes to effect random copolymers, block copolymers or hybrids thereof wherein both random and block units are present. For example, it is possible that any of two or more of the foregoing monomers/reactants may be prereacted prior to polymerization of the final poly(ether esters). Alternatively, a two part synthesis may be employed wherein two different diols and/or dicarboxylic acids are each prereacted in separate reactors to form two low molecular weight prepolymers which are then combined with the long chain ether glycol to form the final triblock poly(ether ester).

Preferred examples of the polyester segment are poly(1,4-butylene terephthalate) and poly(ethylene terephthalate). Preferred polyether segments include a polyalkylene ether glycol, e.g., polyethyleneoxide glycol, polytetramethylene oxide glycol, polypropylene oxide glycol, or a mixture thereof; an aliphatic polyester; or polyalphacaprolactone.

The poly(etherimide esters) elastomers (B)(b) of the present invention comprise the reaction product of (i) one or more diols; (ii) one or more dicarboxylic acids; and (iii)(1)(I) one or more polyoxyalkylene diimide diacids; and optionally (II) one or more tricarboxylic acids or derivatives thereof; (2) a combination of (I) one or more polyoxyalkylene diimide diacids; (II) one or more dimer acids wherein the amount of dimer is from about 5 to about 40 parts by weight based upon 100 parts by weight of (I) and (II); and optionally, (III) one or more tricarboxylic acids or derivatives thereof; or (3) a combination of (I) one or more high molecular weight poly(oxyalkylene) diamines; and (II) one or more tricarboxylic acids or derivatives thereof.

Preferred poly(etherimide ester) elastomers may be prepared from (i) one or more diols, preferably low molecular weight diols, and preferably, one or more $C_2$–$C_{15}$ aliphatic and/or cycloaliphatic diols, (ii) one or more dicarboxylic acids, preferably, one or more $C_4$–$C_{16}$ aliphatic, cycloaliphatic and/or aromatic dicarboxylic acids or ester derivatives thereof, (iii)(1) one or more polyoxyalkylene diimide diacids; (iii)(2) a combination of (I) one or more polyoxyalkylene diimide diacids, (II) one or more dimer acids wherein the amount of dimer is from about 5 to about 40 parts by weight based upon 100 parts by weight of (I) and (II), and optionally (III) one or more tricarboxylic acids or derivatives thereof; or (iii)(3) a combination of (I) one or more high molecular weight poly(oxyalkylene) diamines, and (II) one or more tricarboxylic acids or derivatives thereof. The amount of polyoxyalkylene diimide diacid employed is generally dependent upon the desired properties of the resultant poly(etherimide ester). In general, the weight ratio of polyoxyalkylene diimide diacid component (iii)(1), (2), and/or (3) to dicarboxylic acid (b) is from about 0.25 to about 2.0, and preferably from about 0.4 to about 1.4. These elastomers may contain additional stabilizers for even greater stabilization and low temperature impact strength.

Suitable diols (B)(b)(i) for use in preparing the poly(etherimide esters) elastomers include those described above in the preparation of the poly(ether ester) elastomers (B)(a).

Dicarboxylic acids (B)(b)(ii) which are suitable for use in the preparation of the poly(etherimide esters) herein are as described above in the preparation of poly(ether esters) above. The molecular weight preference pertains to the acid and not to its equivalent ester or ester-forming derivative. Thus, an ester of a dicarboxylic acid having a molecular weight greater than 350 is included provided the acid has a molecular weight below about 350.

Polyoxylakylene diimide diacids (B)(b)(iii) suitable for use in the preparation of poly(etherimide ester) elastomers are high molecular weight diimide diacids wherein the number average molecular weight is greater than about 700 and most preferably greater than about 900. They may be prepared by the imidization reaction of one or more tricarboxylic acid compounds containing two vicinal carboxyl groups or an anhydride group and an additional carboxyl group which must be esterifiable and preferably is nonimidizable with a high molecular weight polyoxyalkylene diamine. These polyoxyalkylene diimide diacids and processes for their preparation are more fully disclosed in U.S. Ser. No. 665,192, filed Oct. 26, 1984 entitled "High Molecular Weight Diimide Diacids and Diimide Diesters of Tricarboxylic Anhydrides".

For example, they may be derived from trimellitic anhydride and a polyalkylene diamine having the formula $$H_2N-G-NH_2$$

wherein G is the divalent radical remaining after removal of the amino groups of a large chain alkylene ether diamine having a molecular weight of from about 600 to 1200.

In general, the polyoxyalkylene diimide diacids may be characterized by the following formula:

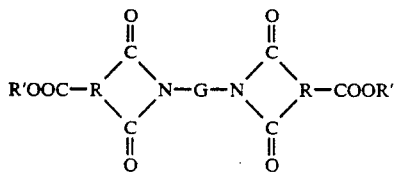

wherein each R is independently a trivalent organic radical, preferably a $C_2$ to $C_{20}$ aliphatic, aromatic or cycloaliphatic trivalent organic radical; each R' is independently selected from the group consisting of hydrogen, $C_1$ to $C_6$ aliphatic and cycloaliphatic monovalent organic radicals and $C_6$ to $C_{12}$ aromatic monovalent organic radicals, e.g. benzyl, most preferably hydrogen; and G is the divalent radical remaining after the removal of the terminal (or as nearly terminal as possible) hydroxy groups of a long chain ether glycol or the divalent radical remaining after the removal of the terminal (or as nearly terminal as possible) amino groups of a long chain alkylene ether diamine, either of which have an average molecular weight of from about 600 to about 12000, preferably from about 900 to about 4000, and a carbon-to-oxygen ratio of from about 1.8 to about 4.3.

Representative long chain ether glycols from which the polyoxyalkylene diamines are prepared include poly(ethylene ether)glycol; poly(propylene ether)glycol; poly(tetramethylene ether)glycol; random or block copolymers of ethylene oxide and propylene oxide, including propylene oxide terminated poly(ethylene ether)glycol or ethylene oxide terminated with poly(propylene ether)glycol or a combination thereof; and random or block copolymers of tetrahydrofuran with minor amounts of a second monomer such as methyl tetrahydrofuran (used in proportion such that the carbon-to-oxygen mole ratio in the glycol does not exceed about 4.3). Especially preferred poly(alkylene ether)glycols are poly(propylene ether)glycol and poly(ethylene ether)glycols end-capped with poly(propylene ether)glycol and/or propylene oxide, poly-(ethylene ether)glycol and/or ethylene oxide or a combination thereof.

In general, the useful polyoxyalkylene diamines will have an average molecular weight of from about 600 to 12000, preferably from about 900 to about 4000.

The tricarboxylic acids useful herein may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable and preferably is substantially nonimidizable.

Further, while trimellitic anhydride is preferred as the tricarboxylic component, any of a number of suitable tricarboxylic acid constituents will occur to those skilled in the art including 2,6,7-naphthalenetricarboxylic anhydride; 3,3',4-diphenyltricarboxylic anhydride; 3,3',4-benzophenonetricarboxylic anhydride; 1,3,4-cyclopentanetricarboxylic anhydride; 2,2',3-diphenyltricarboxylic anhydride; diphenyl sulfone-3,3'4-tricarboxylic anhydride, ethylenetricarboxylic anhydride; 1,2,5-naphthalenetricarboxylic anhydride; 1,2,4-butanetricarboxylic anhydride; diphenyl isopropylidene-3,3'4-tricarboxylic anhydride; 3,4-dicarboxyphenyl-3-carboxyphenyl ether anhydride; 1,3,4-cyclohexanetricarboxylic anhydride; and the like. These tricarboxylic acid materials can be characterized by the following formula:

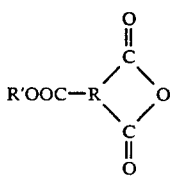

where R is a trivalent organic radical, preferably a $C_2$ to $C_{20}$ aliphatic, aromatic, or cycloaliphatic trivalent organic radical and R' is preferably hydrogen or a monovalent organic radical preferably selected from the group consisting of $C_1$ to $C_{12}$ aromatic radicals, e.g. benzyl; and most preferably hydrogen.

Briefly, these polyoxyalkylene diimide diacids may be prepared by known imidization reactions including melt synthesis or by synthesizing in a solvent system. Such reactions will generally occur at temperatures of from 100° C. to 300° C., preferably at from about 150° C. to about 250° C. while drawing off water or in a solvent system at the reflux temperature of the solvent or azeotropic (solvent) mixture.

Dimer acids (B)(b)(iii)(2)(II) useful herein are themselves prepared by the dimerization of unsaturated fatty acids of 18 carbons. Exemplary of fatty acids from which they may be prepared include but are not limited to oleic acid, linoleic acid and linolenic acid. The preparation and structure of dimer acid is described in Journal of the American Oil Chemists Society, 39, 534–545 (1962), Journal of the American Chemical Society, 66, 84 (1944) and U.S. Pat. No. 2,347,562. Suitable dimer acids may be employed in their unhydrogenated or hydrogenated form and include the acid derivatives thereof.

Several grades of dimer acid which vary in monomer and trimer content are available commercially. Inclusive of suitable commercial dimer acids are those available from Emery Industries under the tradenames EMPOL 1010 (a hydrogenated dimer acid) and EMPOL 1014. EMPOL 1010 is reported as typically containing 97 percent dimer acid, 3 percent trimer acid and essentially no monobasic acid and extremely low unsaturation, whereas EMPOL 1014 is typified as containing 95 percent, 4 percent and 1 percent of dimer, trimer and monobasic acids respectively. Also available are the dimer acids sold under the tradename HYSTRENE from the Humko Products Division of Witco Chemical Corporation, especially HYSTRENE 3695 which typically contain 95 percent dimer acid and a weight ratio of dimer to trimer of 36:1. Preferred grades are substantially free of such monomer and trimer fractions, most preferably less than 5 percent by weight, and are fully saturated, or substantially so.

Where desirable, the dimer acid member may be substantially freed of monomer and trimer fractions by molecular distillation or other suitable means. In general, the dimer acid exists in the poly(etherimide ester) elastomers as a soft or rubber segment, and accordingly, dimer acids of relatively high molecular weight (preferably greater than about 500) are preferred so that the poly(etherimide ester) elastomers are resilient, but do not deform until relatively high temperatures are reached.

The weight ratio of the above ingredients is not critical.

Preferably, the poly(etherimide ester) elastomers comprise the reaction product of dimethylterephthalate, optionally with up to 40 mole percent of another dicarboxylic acid; 1,4-butane diol, optionally with up to 40 mole percent of another saturated or unsaturated aliphatic and/or cycloaliphatic diol; and a polyoxyalkylene diimide diacid prepared from a polyoxyalkylene diamine of molecular weight of from about 600 to about 12000, preferably from about 900 to about 4000, and trimellitic anhydride. Most preferably, the diol will be 100 mole percent 1,4-butane diol and the dicarboxylic acid, 100 mole percent dimethylterephthalate.

When a dimer acid is used in combination with the polyoxyalkylene diimide diacid, preferably, the poly(etherimide ester)elastomer will comprise the reaction product of dimethylterephthalate, optionally with up to 40 mole percent of another dicarboxylic acid; 1,4-butane diol, optionally with up to 40 mole percent of another saturated or unsaturated aliphatic and/or cycloaliphatic diol; and a combination of (I) a polyoxyalkylene diimide diacid prepared from a polyoxyalkylene diamine of molecular weight of from about 600 to about 12000, preferably from about 900 to 4000 and (II) dimer acid in an amount of from about 10 to about 40 percent by weight, most preferably from about 15 to about 30 percent by weight based on the combined weight of (I) and (II), and optionally trimellitic anhydride. Most preferably, the diol will be 100 mole percent 1,4-butane diol, and the dicarboxylic acid will be 100 mole percent dimethylterephthalate.

These poly(etherimide ester) elastomers described herein may be prepared by conventional esterification/condensation reactions for the production of polyesters. Exemplary of the processes that may be practiced are as set forth in, for example, U.S. Pat. Nos. 3,023,192; 3,763,109; 3,651,014; 3,663,653; and 3,801,547. Additionally, these compositions may be prepared by such processes and other known processes to effect random copolymers, block copolymers or hybrids thereof wherein both random and block units are present.

It is customary and preferred to utilize a catalyst in the process for the production of the poly(etherimide ester) elastomers of the present invention. In general, any of the known ester-interchange and polycondensation catalysts may be used. Although two separate catalysts or catalyst systems may be used, one for ester interchange and one for polycondensation, it is preferred, where appropriate, to use one catalyst or catalyst system for both In those instances where two separate catalysts are used, it is preferred and advantageous to render the ester-interchange catalyst ineffective following the completion of the precondensation reaction by means of known catalyst inhibitors or quenchers, in particular, phosphorus compounds such as phosphoric acid, phosphenic acid, phosphonic acid and the alkyl or aryl esters or salts thereof, in order to increase the thermal stability of the resultant polymer.

Suitable catalysts include but are not limited to the acetates, carboxylates, hydroxides, oxides, alcoholates or organic complex compounds of zinc, manganese, antimony, cobalt, lead, calcium and the alkali metals insofar as these compounds are soluble in the reaction mixture. Specific examples include, zinc acetate, calcium acetate and combinations thereof with antimony tri-oxide and the like. These catalysts as well as additional useful catalysts are described in U.S. Pat. Nos. 2,465,319; 2,534,028; 2,850,483; 2,892,815; 2,937,160; 2,998,412; 3,047,539; 3,110,693 and 3,385,830.

Where the reactants and reactions allow, it is preferred to use the titanium catalysts including the inorganic and organic titanium containing catalysts, such as those described in, for example U.S. Pat. Nos. 2,720,502; 2,727,881; 2,729,619; 2,822,348; 2,906,737; 3,047,515; 3,056,817; 3,056,818; and 3,075,952. Especially preferred are the organic titanates such as tetrabutyl titanate, tetra-isopropyl titanate and tetra-octyl titanate, and the complex titanates derived from alkali or alkaline earth metal alkoxides and titanate esters, most preferably the organic titanates. These too may be used alone or in combination with other catalysts such as for example, zinc acetate, manganese acetate or antimony trioxide, and/or with a catalyst quencher as described above.

These poly(etherimide ester) elastomers are further described in U.S. Pat. Nos. 4,544,734; 4,556,688; and 4,556,705.

Additionally, copolymer elastomers (B)(c) having monomeric units of (ether esters) and (etherimide esters) as described above are suitable for use in the present invention. Preferably such a copolymer will comprise a block copolymer having poly(ether ester) blocks and poly(etherimide ester) blocks. Preparation of such copolymers can be affected as above and would be within the skill of one of ordinary skill in the art.

The copolymers (B)(d) comprising (i) ethylene and (ii) one or more comonomers copolymerizable therewith to produce a solid copolymer preferably comprise 40 to 80 parts by weight of (i) and 20 to 60 parts by weight of (ii) based upon 100 parts by weight of (i) and (ii) combined, and most preferably comprise 50 to 70 parts by weight of (i) and 30 to 50 parts by weight of (ii) based upon 100 parts by weight of (i) and (ii).

Preferably, the comonomer (B)(d)(ii) comprises an unsaturated mono- or dicarboxylic acid of 2–20 carbon atoms, esters of unsaturated mono- or dicarboxylic acids, vinyl esters of saturated carboxylic acids where the acid has 1–18 carbon atoms, vinyl alkyl ethers wherein the alkyl group has 1–18 carbon atoms, acrylonitrile, norbornene, alpha-olefins of 3–12 carbon atoms, and vinyl aromatic compounds. Especially preferred is vinyl acetate.

In the compositions of the present invention, component (A) comprises a major portion and component (B) comprises a minor portion of (A) and (B), preferably component (A) comprises from about 75 to about 99 parts by weight and component (B) comprises from about 1 to about 25 parts by weight based upon 100 parts by weight of (A) and (B) combined, and most preferably, component (A) comprises about 80 parts by weight and component (B) comprises about 20 parts by weight based upon 100 parts by weight of (A) and (B) combined.

Special mention is made of blends comprising the compositions of the present invention. Additionally, the compositions of the present invention may be molded, extruded or thermoformed into articles by conventional methods known to one of ordinary skill in the art.

Conventional processes for mixing thermoplastic polymers can be used for the manufacture of the compositions within the present invention. For example, the compositions can be manufactured using any suitable mixing equipment, cokneaders, or extruders under conditions known to one of ordinary skill in the art.

Additionally, conventional additives such as stabilizers, for example 3,5-di-tert-butyl-4 hydroxy hydrocinnamic triester with 1,3,5-tris-(2-hydroxy ethyl)-3-triazine-2,4,6-(1H,3h,5H) trione, reinforcing fillers, flame retardants, impact modifiers, pigments or combinations of any of the foregoing, may be added to the compositions of the present invention.

Impact modifiers useful herein include but are not limited to multi-stage core-shell polymers having a rubbery core derived from an acrylate or a (meth)acrylate, a diene, or a mixture of the foregoing, and a vinyl-based polymer or copolymer outer shell, some of which are available commercially under the tradenames ACRYLOID® KM 330, also known as PARALOID® EXL 3330, or ACRYLOID® KM 653, also known as PARALOID® EXL 3691, from Rohm & Haas Company.

Suitable impact modifiers also include ABS modifiers which are typically represented by graft copolymers of vinyl cyanide-conjugated diolefin-alkenyl aromatic. They particularly comprise acrylonitrile-butadiene-styrene graft copolymers, but also encompass mixtures of analogous materials.

Preferably, the ratio of styrene to acrylonitrile in the terpolymer ranges from about 3.5 to 1 to about 2.5 to 1 and the ratio of butadiene to styrene/acrylonitrile is 7 to 3. Most preferably, the ratio of styrene to acrylonitrile is either 3.5 to 1, 3 to 1 or 2.5 to 1.

DESCRIPTION OF THE PREFERRED EMBODIMENT

The following examples illustrate the invention without limitation. All parts are given by weight unless otherwise indicated. Impact strengths are represented as notched Izod according to ASTM-D-256 at 23° C. unless otherwise specified. Tensile properties are measured by ASTM-D-638 as flexural modulus, tensile strength and tensile elongation. Melt viscosities are determined at 250° C. unless otherwise indicated.

EXAMPLE 1

A well mixed dry blend of 80.0 parts of poly(1,4-butylene cyclohexanedicarboxylate) (PBCD) (melt viscosity 5500 poise) and 20.0 parts of poly(ether ester) elastomer (LOMOD®Ba-General Electric Company—Pittsfield, Mass.) was extruded on an extruder operating at 100 rpm with barrel zones at 230° C.

Properties are summarized in Table 1.

COMPARATIVE EXAMPLE 1A*

The procedure of Example 1 was followed substituting 100.0 parts of PBCD (melt viscosity 5500 poise) for the dry blend.

Properties are summarized in Table 1.

COMPARATIVE EXAMPLE 1B*

The procedure of Example 1 was followed substituting 100.0 parts poly(ether ester) elastomer (LOMOD® Ba-General Electric Company) for the dry blend. Properties are summarized in Table 1.

EXAMPLE 2

The procedure of Example 1 was followed substituting a dry blend of 80.0 parts of PBCD (melt viscosity 5500 poise) and 20.0 parts of poly(etherimide ester) (LOMOD®J25-General Electric Company).

Properties are summarized in Table 1.

COMPARATIVE EXAMPLE 2A*

The procedure of Example 1 was followed substituting 100.0 parts of poly(etherimide ester) elastomer (LOMOD®J25-General Electric Company) for the dry blend.

Properties are summarized in Table 1.

EXAMPLE 3

The procedure of Example 1 is followed substituting a dry blend of 80.0 parts by weight of PBCD (melt viscosity 5500 poise) and 20.0 parts of ethylene-vinyl acetate copolymer (ELVAX®350-EVA-E.I. DuPont de Nemours & Co.—Wilmington, Del.).

Properties are summarized in Table 1.

COMPARATIVE EXAMPLE 3A*

The procedure of Example 1 was followed substituting 100.0 parts ethylene-vinyl acetate copolymer (ELVAX®350-EVA-E.I. DuPont de Nemours & Co.—Wilmington, Del.) for the dry blend.

Properties are summarized in Table 1.

Examples 1–4 when compared with Comparative Examples 1A*, 1B*, 2A* and 3A* illustrate the improvement in tensile strength at yield by the addition of the particular modifiers with relatively low tensile strength impart to polyesters of the present invention.

TABLE 1

| | PBCD BINARY BLENDS | | | | | | |
|---|---|---|---|---|---|---|---|
| | 1 | 1A* | 1B* | 2 | 2A* | 3 | 3A* |
| PBCD[A] | 80.0 | 100.0 | — | 80.0 | — | 80.0 | — |
| Poly(ether ester)[B] | 20.0 | — | 100.0 | — | — | — | — |
| Poly(etherimide ester)[C] | — | — | — | 20.0 | 100.0 | — | — |
| Ethylene-Vinyl Acetate Copolymer[D] | — | — | — | — | — | 20.0 | 100.0 |
| Notched Izod @ room temp. (fpi) | 13.8 | 1.9 | NB | 13.8 | NB | 15.0 | NB |
| Tensile strength (psi) | 6200 | 3700 | 3050 | 4100 | 3400 | 4980 | 1200 |
| Tensile elongation (%) | 530 | 550 | 400 | 430 | 200 | 390 | 800 |
| Flexural modulus (kpsi) | 64 | 99 | 31 | 55 | 30 | 59 | 26 |

[A]Poly(1,4-butylene cyclohexanedicarboxylate) - PBCD - melt viscosity 5500 poise.
[B]LOMOD ®Ba - General Electric Company - Pittsfield, MA.
[C]LOMOD ®J25 - General Electric Company - Pittsfield, MA.
[D]ELVAX ®350 - Polyethylene-vinyl acetate copolymer - E. I. DuPont de Nemours & Co. - Wilmington, DE.

All patents, applications, publications, and test methods mentioned above are hereby incorporated by reference.

Many variations of the present invention will suggest themselves to those skilled in this art in light of the above, detailed description For example, the blends of the examples can comprise poly(25-cis 75-trans-1,4-cyclohexanedimethylene-trans-1,4-cyclohexanedicarboxylate). All such obvious variations are within the full intended scope of the appended claims.

We claim:

1. A composition consisting of
   (A) from 75 to 99 parts by weight of a poly(1,4-butylene cyclohexanedicarboxylate) resin; and
   (B) from 1 to about 25 parts by weight of a poly(etherimide ester) elastomer; wherein the sum of (A) and (B) is 100 parts by weight.

2. A composition as defined in claim 1 where said poly(etherimide ester) elastomer (B)(b) comprises the reaction product of
   (i) one or more diols;
   (ii) one or more dicarboxylic acids; and
   (iii) (1)(I) one or more polyoxyalkylene diimide diacids and optionally
   (II) one or more tricarboxylic acids or derivatives thereof;
   (2) a combination of
   (I) one or more polyoxyalkylene diimide diacids, and
   (II) one or more dimer acids wherein the amount of dimer is from about 5 to about 40 parts by weight based upon 100 parts by weight of (I) and (II), and optionally
   (III) one or more tricarboxylic acids or derivatives thereof; or
   (3) a combination of
   (I) one or more high molecular weight poly(oxyalkylene) diamines; and
   (II) one or more tricarboxylic acids or derivatives thereof.

3. A composition as defined in claim 2 wherein said diol (B)(b)(i) is a low molecular weight diol.

4. A composition ion as defined in claim 2 wherein said diol (B)(b)(i) is a $C_2$ to $C_{15}$ aliphatic or cycloaliphatic diol or a mixture thereof.

5. A composition as defined in claim 4 wherein said diol (B)(b)(i) comprises 1,4-butane diol.

6. A composition as defined in claim 2 wherein said carboxylic acid (B)(b)(ii) is selected from the group consisting of a $C_2$ to $C_{16}$ aliphatic dicarboxylic acid, a $C_2$ to $C_{16}$ cycloaliphatic dicarboxylic acid, a $C_8$ to $C_{16}$ aromatic dicarboxylic acid, the ester equivalents thereof, and mixtures of any of the foregoing.

7. A composition as defined in claim 6 wherein said dicarboxylic acid (B)(b)(ii) comprises dimethylterephthalate.

8. A composition as defined in claim 2 wherein said polyoxyalkylene diimide diacid component (B)(b)(iii) is derived from one or more polyoxyalkylene diamines and one or more tricarboxylic acid compounds containing two vicinal carboxyl groups, or an anhydride group and an additional carboxyl group, and has the formula

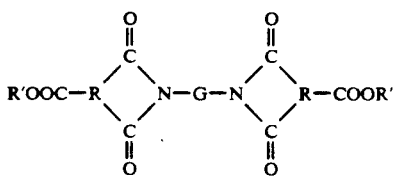

wherein each R is independently selected from the group consisting of $C_2$ to $C_{20}$ aliphatic and cycloaliphatic trivalent organic radicals and $C_6$ to $C_{20}$ aromatic trivalent organic radicals; each R' is independently selected from the group consisting of hydrogen, $C_1$ to $C_6$ aliphatic and cycloaliphatic monovalent organic radicals and $C_6$ to $C_{12}$ aromatic monovalent organic radicals, and G is the radical remaining after removal of the hydroxy groups of a long chain ether glycol having an average molecular weight of from about 600 to 12000.

9. A composition as defined in claim 8 wherein said each R is independently the same or a different $C_6$ trivalent aromatic hydrocarbon radical, each R' is hydrogen and G is the radical remaining after removal of the hydroxy groups of a long chain ether glycol having an average molecular weight of from about 900 to 4000.

10. A composition as defined in claim 2 wherein said polyoxyalkylene diimide diacid (B)(b)(iii) is derived from trimellitic anhydride and a polyoxyalkylene diamine selected from the group consisting of polypropylene oxide diamine and a copoly(ethylene oxide-propylene oxide)diamine having predominantly polypropylene oxide, polyethylene oxide or a combination of polypropylene oxide and polyethylene oxide in the backbone.

11. A composition as defined in claim 2 wherein said dimer acid (B)(b)(iii)(2)(II) is selected from the group consisting of dimerized, unsaturated fatty acids, the hydrogenated derivatives thereof and the acid functioning derivatives thereof.

12. A composition as defined in claim 11 wherein said dimer acid (B)(b)(iii)(2)(II) comprises a hydrogenated dimer acid.

13. A composition as defined in claim 12 wherein said dimer acid (B)(b)(iii)(2)(II) is the hydrogenated derivative of a dimerized unsaturated fatty acid.

14. A composition as defined in claim 2 wherein up to a minor amount of said tricarboxylic acid (B)(b)(iii)(1)(II), (B)(b)(iii)(2)(III), or (B)(b)(iii)(3)(II) is selected from the group consisting of carboxylic acid anhydrides having an additional carboxyl group and tricarboxylic acid compounds having two vicinal carboxyl groups.

15. A composition as defined in claim 14 wherein said tricarboxylic acid component has the following formula

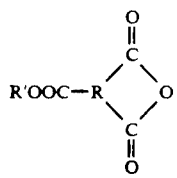

wherein R is selected from the group consisting of $C_2$ to $C_{20}$ aliphatic and cycloaliphatic trivalent organic radicals and $C_6$ to $C_{20}$ aromatic trivalent organic radicals and R' is selected from the group consisting of hydrogen, $C_1$ to $C_6$ aliphatic and cycloaliphatic monovalent organic radicals and $C_6$ to $C_{10}$ aromatic monovalent organic radicals.

16. A composition as defined in claim 15 wherein said tricarboxylic component comprises trimellitic anhydride.

17. A composition as defined in claim 2 wherein said poly(etherimide ester) elastomer comprises the reaction product of (i) 1,4-butanediol; (ii) dimethylterephthalate; and (iii) a polyoxyalkylene diimide diacid derived from trimellitic anhydride and a polyoxyalkylene diamine having the formula:

wherein G is the divalent radical remaining after removal of the hydroxy groups of a long chain ether glycol having molecular weight of from about 600 to about 12000.

18. A composition as defined in claim 17 wherein said long chain ether glycol has a molecular weight of from about 900 to about 4000.

19. A composition as defined in claim 17 wherein said long chain ether glycol is selected from the group consisting of polypropylene ether glycol and co(polyethylene ether-propylene ether)glycol having a predominantly polypropylene ether, polyethylene ether or a combination of polypropylene ether and polyethylene ether backbone.

20. A composition as defined in claim 2 wherein said poly(etherimide ester) elastomer (B)(b) comprises the reaction product of (i) 1,4-butane diol, (ii) dimethylterephthalate, and (iii) a combination of (1) a polyoxyalkylene diimide diacid derived from trimellitic anhydride and a polyalkylene diamine having the formula

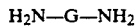

wherein G is the divalent radical remaining after removal of the amino groups of a large chain alkylene ether diamine having a molecular weight of from about 600 to 12000 and (2) a dimer acid wherein the dimer is from about 5 to about 40 part by weight based upon 100 parts by weight of (1) and (2) combined.

21. A composition as defined in claim 20 wherein said long chain alkylene ether diamine is selected from the group consisting of polypropylene ether diamine and co(polyethylene-propylene ether diamine) having a predominantly polypropylene ether, polyethylene ether or a combination of polypropylene ether and polyethylene ether backbone.

22. A composition as defined in claim 2 comprising said poly(etherimide ester) elastomer (B)(b) comprises the reaction product of (i) 1,4-butane diol;
(ii) dimethylterephthalate; and
(iii)(1)(I) a polyoxylalkylene diimide diacid derived from trimellitic anhydride and a polyoxyalkylene diamine having the formula:

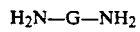

wherein G is the divalent radical remaining after removal of the hydroxy groups of a long chain ether glycol having molecular weight of from about 600 to about 12000, and (II) a tricarboxylic acid.

23. A composition as defined in claim 22 wherein said tricarboxylic acid (B)(b)(iii)(1)(II) comprises trimellitic anhydride.

24. A composition as defined in claim 23 wherein said long chain alkylene ether diamine is selected from the groups consisting of polypropylene ether diamine and co(polyethylene-propylene ether diamine) having a predominantly polypropylene ether, polyethylene ether, or a combination of polypropylene ether and polyethylene ether backbone.

25. A composition as defined in claim 2 wherein said poly(etherimide ester) elastomer (B)(b) further comprises (iv) a stabilizer.

26. A composition as defined in claim 25 wherein said stabilizer comprises 3,5-di-tert-butyl-4-hydroxy hydrocinnamic triester with 1,3,5-tris-(2-hydroxy ethyl)-3-triazine-2,4,6(1H,3H,5H) trione.

27. An article thermoformed from a composition as defined in claim 1.

28. An article extruded from a composition as defined in claim 1.

29. An article molded from a composition as defined in claim 1.

30. A composition consisting of:
(A) about 80 parts by weight of a poly(1,4-butylene cyclohexanedicarboxylate) resin; and
(B) about 20 parts by weight of a poly(etherimide ester) elastomer.

* * * * *